US012251720B1

(12) United States Patent
Rong

(10) Patent No.: US 12,251,720 B1
(45) **Date of Patent: *Mar. 18, 2025**

(54) MULTI-MODE FLUID NOZZLES

(71) Applicant: InnoMist LLC, Addison, TX (US)

(72) Inventor: Xinqi Rong, Dallas, TX (US)

(73) Assignee: Innomist LLC, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,715

(22) Filed: Dec. 18, 2023

Related U.S. Application Data

(63) Continuation of application No. 18/101,922, filed on Jan. 26, 2023, now Pat. No. 11,845,091, which is a continuation of application No. 17/220,264, filed on Apr. 1, 2021, now Pat. No. 11,590,518, which is a continuation of application No. 16/249,877, filed on (Continued)

(51) Int. Cl.
*B05B 1/16* (2006.01)
*B05B 1/12* (2006.01)
*B05B 1/18* (2006.01)
*B05B 1/34* (2006.01)

(52) U.S. Cl.
CPC ................ *B05B 1/169* (2013.01); *B05B 1/12* (2013.01); *B05B 1/1627* (2013.01); *B05B 1/18* (2013.01); *B05B 1/341* (2013.01)

(58) Field of Classification Search
CPC ......... B05B 1/12; B05B 1/1627; B05B 1/169; B05B 1/18; B05B 1/185; B05B 1/3405; B05B 1/341; B05B 1/3421; B05B 1/3426; B05B 1/3478
See application file for complete search history.

(56) References Cited

U.S. PATENT DOCUMENTS

| | | | |
|---|---|---|---|
| 2,428,748 | A | 10/1947 | Barz |
| 2,567,642 | A | 9/1951 | Henshaw |

(Continued)

FOREIGN PATENT DOCUMENTS

| | | | |
|---|---|---|---|
| CN | 203540745 | U | 4/2014 |
| CN | 102444510 | B | 3/2015 |

(Continued)

OTHER PUBLICATIONS

English language translation of DE-19752245-A1 (Walzel) (Year: 1999).*

*Primary Examiner* — Darren W Gorman
(74) *Attorney, Agent, or Firm* — Lawrence Youst PLLC

(57) ABSTRACT

A multi-mode fluid nozzle includes a mixing chamber with a stream mode fluid inlet connected to one side of the chamber, a fluid outlet connected to the opposite side of the chamber and at least one mist mode fluid inlet connected to the periphery of the chamber. The discharge pattern of the nozzle depends upon the inlets fluid enters the mixing chamber such that when the fluid enters the mixing chamber through the stream mode fluid inlet, the fluid exits the fluid outlet in a stream flow discharge pattern, when the fluid enters the mixing chamber through the at least one mist mode fluid inlet, the fluid exits the fluid outlet in a mist flow discharge pattern and when the fluid enters the mixing chamber through the stream mode and the at least one mist mode fluid inlets, the fluid exits the fluid outlet in a droplet flow discharge pattern.

20 Claims, 7 Drawing Sheets

Related U.S. Application Data

Jan. 16, 2019, now Pat. No. 10,974,259, which is a continuation of application No. 15/919,387, filed on Mar. 13, 2018, now abandoned.

(56) References Cited

U.S. PATENT DOCUMENTS

| | | | | |
|---|---|---|---|---|
| 2,772,031 | A | 11/1956 | Roselund | |
| 2,999,647 | A | 9/1961 | Benjamin | |
| 3,149,783 | A | 9/1964 | Benjamin | |
| 4,087,050 | A | 5/1978 | Tsuji et al. | |
| 4,109,869 | A * | 8/1978 | Brockelsby | B05B 11/0005 239/491 |
| 4,394,965 | A | 7/1983 | Backe et al. | |
| 5,388,766 | A | 2/1995 | Buisson | |
| 5,711,488 | A | 1/1998 | Lund | |
| 5,829,681 | A | 11/1998 | Hamel et al. | |
| 5,934,555 | A | 8/1999 | Dobbeling et al. | |
| 6,016,969 | A | 1/2000 | Tilton et al. | |
| 6,045,058 | A | 4/2000 | Dobbeling et al. | |
| 6,161,782 | A | 12/2000 | Heinbuck et al. | |
| 6,719,218 | B2 | 4/2004 | Cool et al. | |
| RE39,767 | E | 8/2007 | Soule et al. | |
| 7,320,440 | B2 | 1/2008 | Prociw et al. | |
| 7,478,767 | B2 | 1/2009 | Wu | |
| 7,735,749 | B2 | 6/2010 | Tippetts | |
| 8,104,697 | B2 | 1/2012 | Petrovic | |
| 8,640,980 | B2 | 2/2014 | Nordstrom | |
| 10,974,259 | B2 | 4/2021 | Rong | |
| 11,590,518 | B2 | 2/2023 | Rong | |
| 2004/0060301 | A1 * | 4/2004 | Chen | F23R 3/346 60/776 |
| 2005/0001065 | A1 | 1/2005 | Senecal | |
| 2007/0018017 | A1 | 1/2007 | Tilton et al. | |
| 2007/0194146 | A1 | 8/2007 | Dorendorf | |
| 2011/0031328 | A1 | 2/2011 | Rundle et al. | |
| 2011/0284661 | A1 | 11/2011 | Chang et al. | |
| 2012/0228407 | A1 | 9/2012 | Torontow | |
| 2016/0059243 | A1 | 3/2016 | Parisi-Amon et al. | |
| 2016/0320062 | A1 | 11/2016 | Zajadatz et al. | |
| 2017/0252758 | A1 | 9/2017 | Lin et al. | |

FOREIGN PATENT DOCUMENTS

| | | | | |
|---|---|---|---|---|
| DE | 19752245 | A1 * | 6/1999 | B05B 7/0483 |
| GB | 2392119 | B | 10/2005 | |
| WO | 2012090118 | A1 | 7/2012 | |
| WO | 2016156883 | A1 | 10/2016 | |

* cited by examiner

MULTI-MODE FLUID NOZZLES

CROSS-REFERENCE TO RELATED APPLICATIONS

The present application is a continuation of co-pending application Ser. No. 18/101,922 filed Jan. 26, 2023, which is a continuation of application Ser. No. 17/220,264 filed Apr. 1, 2021, now U.S. Pat. No. 11,590,518 B2, which is a continuation of application Ser. No. 16/249,877 filed Jan. 16, 2019, now U.S. Pat. No. 10,974,259 B2, which is a continuation of application Ser. No. 15/919,387 filed Mar. 13, 2018, abandoned.

TECHNICAL FIELD OF THE DISCLOSURE

The present disclosure relates, in general, to fluid nozzles operable for use in fluid flow heads and, in particular, to multi-mode fluid nozzles capable of operating in any one of a stream mode, a mist mode and a droplet mode.

BACKGROUND

Traditional showerheads, as often installed in domestic bathrooms, generally employ a simple spray head attached to a threaded water pipe protruding through the shower wall. These showerheads typically feature a generally-conical or bell-shaped profile. At the narrow end of the conical or bell-shaped body of the showerhead, a single female-threaded inlet connects to the male-threaded end of the water pipe. At the broader end of the cone or bell, an array of small orifices directs the water into an array of streams, generally in a conical pattern, in order to disperse the water across a wider area within the shower enclosure. These types of spray heads are not limited to domestic showers. Similar types of spray heads are used in kitchen faucets, power washers, garden hose attachments and other applications.

SUMMARY

The present application discloses various apparatuses for emitting fluid in a variable, customizable manner. In particular, the disclosure relates to a fluid flow head incorporating an array of multi-mode fluid nozzles operable to function in a stream mode, a mist mode or a droplet mode. The flow mode of the multi-mode fluid nozzles disclosed herein is controlled via the various inlets to each nozzle. When a stream flow is desired, fluid is introduced via a central inlet having a direct line to the nozzle outlet. When a mist flow is desired, fluid is introduced to the nozzle via a tangential inlet disposed around the periphery of the nozzle causing the fluid to swirl within the nozzle. When a droplet flow are desired, fluid is introduced to the nozzle via the central inlet and the tangential inlet simultaneously.

In a first aspect, the present disclosure is directed to a multi-mode fluid nozzle having a stream flow mode, a mist flow mode and a droplet flow mode. The nozzle includes a mixing chamber having a generally-circular first side with a diameter, a generally-circular second side opposite of the first side and spaced from the first side by a length, a periphery disposed between the first and second sides and a central portion. The nozzle includes a stream mode fluid inlet connected to the first side of the mixing chamber at the central portion thereof, at least one mist mode fluid inlet connected to the periphery of the mixing chamber and a fluid outlet connected to the second side of the mixing chamber at the central portion thereof. The diameter of the first side is greater than the length of the mixing chamber. In the stream flow mode, fluid enters the mixing chamber through the stream mode fluid inlet and forms a stream flow discharge pattern exiting the fluid outlet. In the mist flow mode, fluid enters the mixing chamber through the at least one mist mode fluid inlet and forms a mist flow discharge pattern exiting the fluid outlet. In the droplet flow mode, fluid enters the mixing chamber through the stream mode fluid inlet and the at least one mist mode fluid inlet and forms a droplet flow discharge pattern exiting the fluid outlet.

In some embodiments, the at least one mist mode fluid inlet may be connected at an angle tangential to the periphery of the mixing chamber. In certain embodiments, the at least one mist mode fluid inlet may be two mist mode fluid inlets each of which is connected at an angle tangential to the periphery of the mixing chamber. In some embodiments, the at least one mist mode fluid inlet may be three mist mode fluid inlets each of which is connected at an angle tangential to the periphery of the mixing chamber. In certain embodiments, the at least one mist mode fluid inlet may be four mist mode fluid inlets, each of which is connected at an angle tangential to the periphery of the mixing chamber. In some embodiments, the diameter of the first side may be greater than twice the length of the mixing chamber. In certain embodiments, the stream mode fluid inlet may be inline with the fluid outlet. In some embodiments, the stream mode fluid inlet may be coaxial with the fluid outlet. In certain embodiments, the fluid outlet may be a diverging conical fluid outlet.

In some embodiments, a circumferential ridge may be disposed within the mixing chamber to guide and shape swirling flow in therein. In certain embodiments, the circumferential ridge may form an outer sloped surface. In some embodiments, the circumferential ridge may be disposed within the mixing chamber at an interface between the fluid outlet and the second side of the mixing chamber. In such embodiments, the circumferential ridge may taper from increasing to decreasing thickness from the second side toward the first side of the mixing chamber. In certain embodiments, the circumferential ridge may be disposed within the mixing chamber at an interface between the stream mode fluid inlet and the first side of the mixing chamber. In such embodiments, the circumferential ridge may taper from increasing to decreasing thickness from the first side toward the second side of the mixing chamber.

In a second aspect, the present disclosure is directed to a multi-mode fluid flow head that has a plurality of multi-mode fluid nozzles each having a discharge pattern. Each nozzle includes a mixing chamber having a generally-circular first side with a diameter, a generally-circular second side opposite of the first side and spaced from the first side by a length, a periphery disposed between the first and second sides and a central portion. The nozzle includes a stream mode fluid inlet connected to the first side of the mixing chamber at the central portion thereof, at least one mist mode fluid inlet connected to the periphery of the mixing chamber and a fluid outlet connected to the second side of the mixing chamber at the central portion thereof. The diameter of the first side is greater than the length of the mixing chamber. In the stream flow mode, fluid enters the mixing chamber through the stream mode fluid inlet and forms a stream flow discharge pattern exiting the fluid outlet. In the mist flow mode, fluid enters the mixing chamber through the at least one mist mode fluid inlet and forms a mist flow discharge pattern exiting the fluid outlet. In the droplet flow mode, fluid enters the mixing chamber through the stream mode fluid inlet and the at least one mist mode fluid inlet and forms a droplet flow discharge pattern exiting the fluid outlet.

In some embodiments, the multi-mode fluid flow head may be a multi-mode shower head assembly. In other embodiments, the multi-mode fluid flow head may be a multi-mode faucet assembly. In certain embodiments, the plurality of multi-mode fluid nozzles may form at least one circular array of multi-mode fluid nozzles. In some embodiments, the plurality of multi-mode fluid nozzles may form a plurality of circular arrays of multi-mode fluid nozzles.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Figure 1:
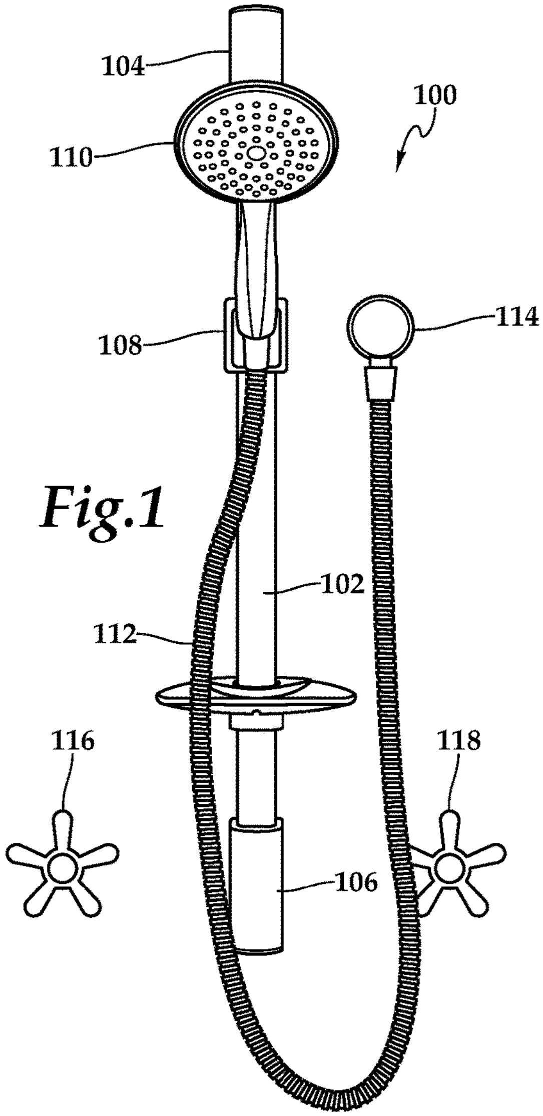
FIG. 1 is a schematic illustration of a shower head assembly including a plurality of multi-mode fluid nozzles in accordance with embodiments of the present disclosure.

FIG. 1 is a front view of a shower assembly 100 according to embodiments of the present disclosure. Assembly 100 comprises vertical rod 102, secured by upper rod mount 104 and lower rod mount 106. Shower head mount 108 is affixed to vertical rod 102 between upper rod mount 104 and lower rod mount 106. Shower head 110 is securable to shower head mount 108. Water line 112 connects a wall connection 114 to shower head 110 and provides water thereto. Valves 116, 118 control the temperature and water flowrate through piping to wall connection 114 and through water line 112 to shower head 110. According to the present disclosure, shower head 110 incorporates an array of multi-mode fluid nozzles each capable of providing stream flow, mist flow and droplet flow through a common orifice. The details of the multi-mode fluid nozzles will be discussed herein.

Figure 2:
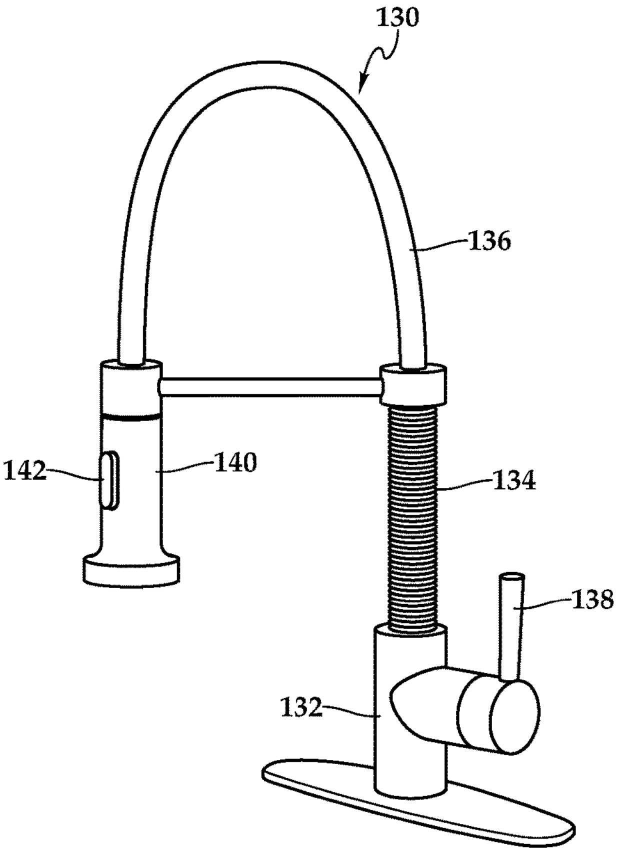
FIG. 2 is a schematic illustration of a gooseneck faucet assembly including a plurality of multi-mode fluid nozzles in accordance with embodiments of the present disclosure.

FIG. 2 is a three-quarters view of a gooseneck faucet assembly 130 incorporating aspects of the present disclosure. Assembly 130 has a base 132, which supports lower neck 134. Upper neck 136 is secured to the upper portion of lower neck 134. The flowrate through assembly 130 is controlled by valve 138. Faucet head 140 is secured to the outer end of upper neck 136. The mode of flow delivered by faucet head 140 is controlled by flow control button 142. As noted above in connection with shower head 110, faucet head 140 incorporates an array of multi-mode fluid nozzles each capable of providing stream flow, mist flow and droplet flow through a common orifice, as described herein.

Figure 3A:
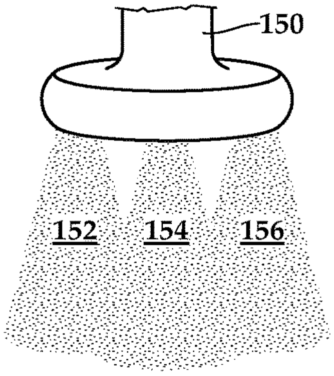
FIGS. 3A-3C are front views of a fluid flow head including a plurality of multi-mode fluid nozzles in various flow modes in accordance with embodiments of the present disclosure.
Figure 3B:
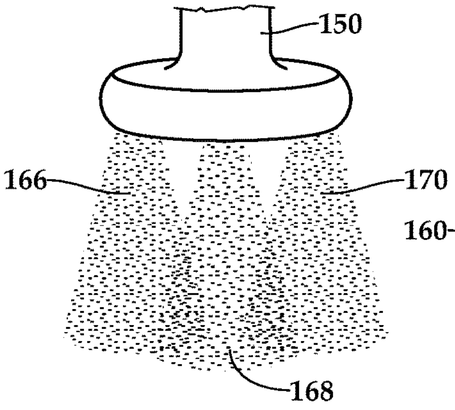
Figure 3C:
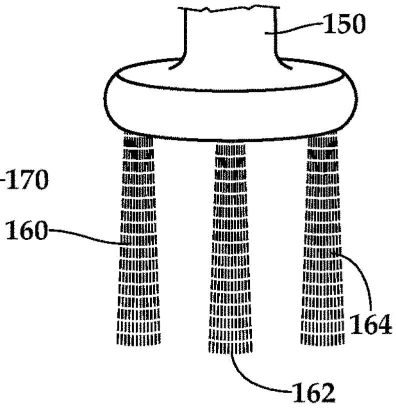

FIGS. 3A, 3B, 3C depict front views of a fluid flow head 150 having a stream flow mode, a mist flow mode and a droplet flow mode. Flow head 150 could be incorporated into shower assembly 100 of FIG. 1 or faucet assembly 130 of FIG. 2, as examples. Flow head 150 comprises an array of multi-mode fluid nozzles according to the present disclosure. In the flow mode shown in FIG. 3A, flow head 150 is operating in a mist mode. In this mode, each of the multi-mode fluid nozzles of fluid head 150 is generating a mist flow discharge pattern depicted as cones 152, 154, 156. The mist flow preferably has a generally-uniform and smallest drop size. In the flow mode shown in FIG. 3C, flow head 150 is operating in a stream mode. In this mode, each of the multi-mode fluid nozzles of fluid head 150 is generating a stream flow discharge pattern depicted as streams 160, 162, 164. The stream flow preferably has a generally-uniform and largest drop size. In the flow mode shown in FIG. 3B, the multi-mode fluid nozzles of fluid head 150 are operating in a droplet flow mode, providing a droplet flow discharge pattern depicted as cones 166, 168, 170. Depending upon the ratio of the input flow, as discussed herein, the droplet flow discharge pattern may have a generally-uniform drop size that is between the drop sizes of the stream flow and the mist flow or the droplet flow discharge pattern may have a dropt size distribution that includes drop sizes between that of the stream flow and the mist flow.

Figure 4A:
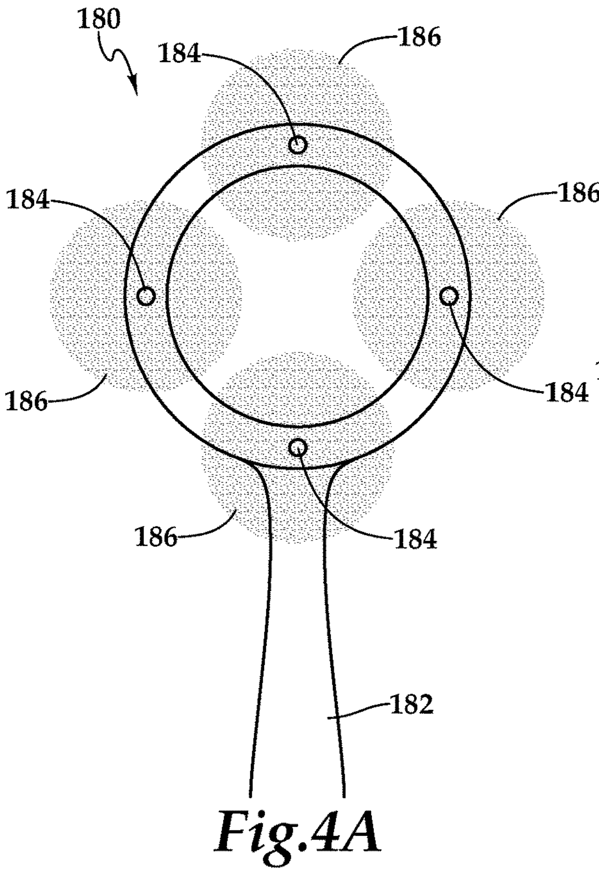
FIGS. 4A-4C are underside views of a fluid flow head including a plurality of multi-mode fluid nozzles in various flow modes in accordance with embodiments of the present disclosure.
Figure 4B:
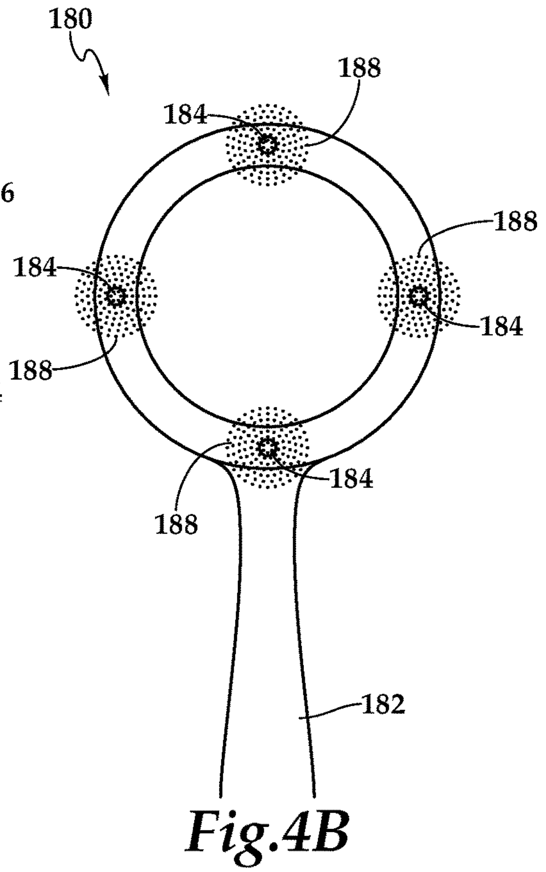
Figure 4C:
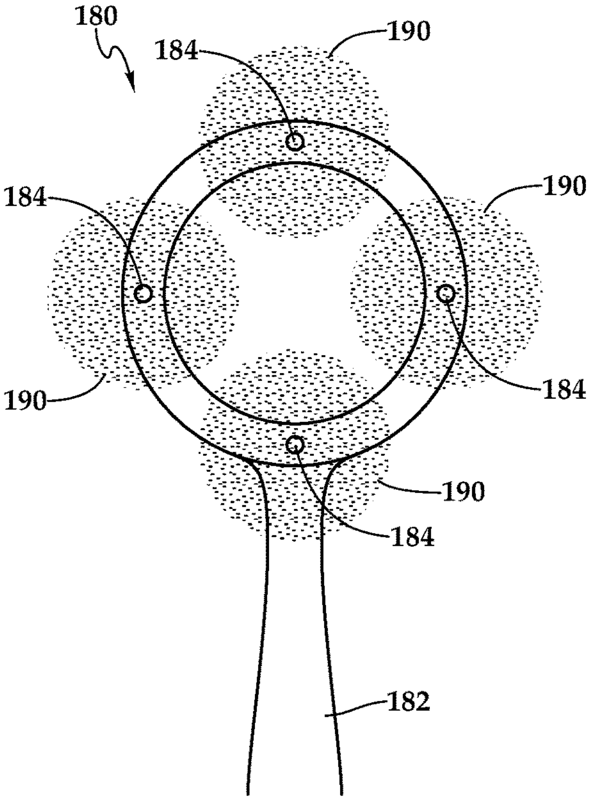
Figure 5D:
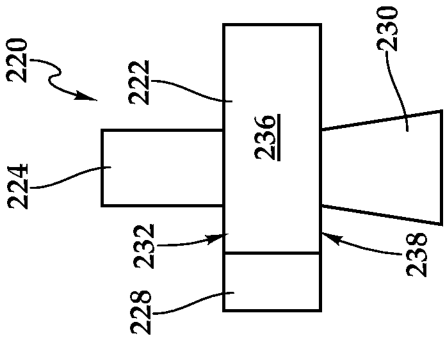
FIGS. 5A-5D are various views of a multi-mode fluid nozzle in accordance with embodiments of the present disclosure.
Figure 5C:
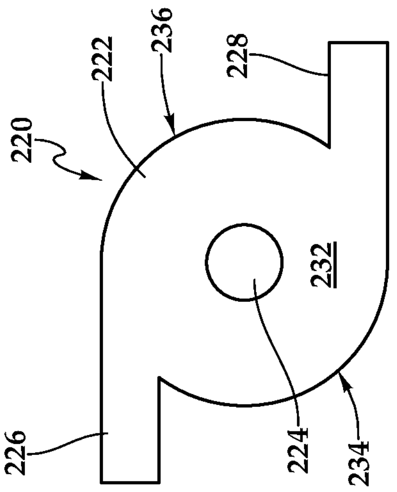
Figure 5B:
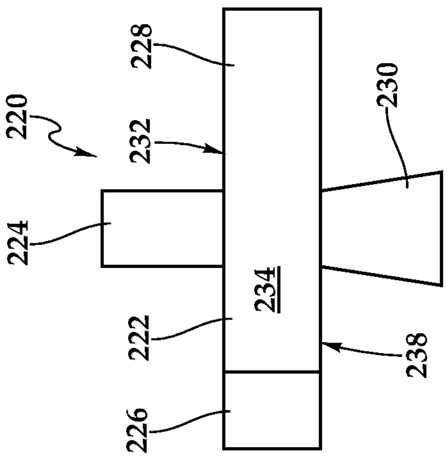
Figure 5A:
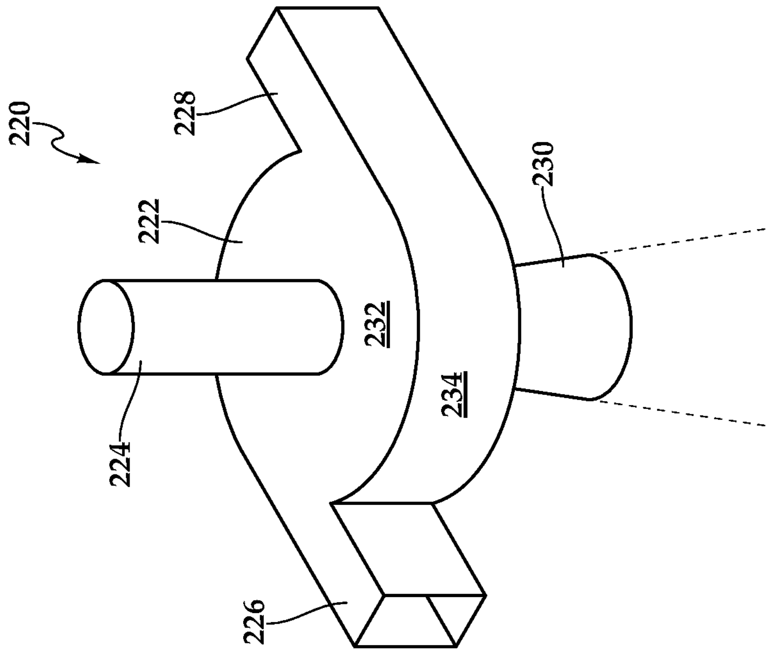

FIGS. 4A, 4B and 4C depict an underside view of a fluid flow head 180 having a stream flow mode, a mist flow mode and a droplet flow mode. Flow head 180 incorporates manifold 182 connected to an array of multi-mode fluid nozzles 184. Manifold 182 may include multiple flow paths controlled by valves for directing fluid to multi-mode fluid nozzles 184 such that the various flow modes may be achieved. FIG. 4A depicts flow head 180 operating in a mist mode, wherein nozzles 184 are generating an array of mist cones 186. FIG. 4B depicts flow head 180 operating in a stream mode, wherein nozzles 184 are generating an array of streams 188. FIG. 4C depicts flow head 180 operating in a droplet mode, wherein nozzles 184 are generating an array of droplet cones 190.

FIGS. 5A-5D comprise isometric, front, top and side views, respectively, of a multi-mode fluid nozzle 220 according to the present disclosure. As seen in FIGS. 5A-5D, fluid nozzle 220 incorporates a stream mode fluid inlet depicted as central inlet 224, a mist mode fluid inlet depicted as tangential inlet 226, a mist mode fluid inlet depicted as tangential inlet 228 and a single fluid outlet 230. In the illustrated embodiment, central inlet 224 is inline with or coaxial with fluid outlet 230. In other embodiments, the stream mode fluid inlet may not be in the center of nozzle 220 and/or may not be inline with or coaxial with fluid outlet 230. Depending on the mode of operation of multi-mode fluid nozzle 220, flow exiting outlet 230 may be mist flow, stream flow or droplet flow. The main body of nozzle 220 comprises a generally-cylindrical mixing chamber 222 defined by an upper side or surface 232, a radiused peripheral surface 234, a radiused peripheral surface 236 and lower side surface 238. The mode of operation of nozzle 220 will depend on the parameters of the fluid sources.

Fluid entering nozzle 220 via central inlet 224 will pass straight through nozzle 220 with little resistance to outlet 230, as outlet 230 is aligned with central inlet 224 at a center portion of nozzle 220. This generally unimpeded fluid will exit nozzle 220 in the form of a compact, relatively uniform stream with larger droplets. Fluid entering nozzle 220 via tangential inlets 226, 228 will be guided by radiused surfaces 234, 236 into a circular swirling motion within mixing chamber 222 of nozzle 220. Fluid moving in this circular pattern will eventually exit nozzle 220 in the form of a dispersed mist of smaller droplets. If all the fluid entering nozzle 220 enters through central inlet 224, nozzle 220 is operating in the stream mode. If all the fluid entering nozzle 220 enters through tangential inlets 226, 228, nozzle 220 is operating in mist mode. If a portion of the fluid entering nozzle 220 enters through central inlet 224 and a portion of the fluid entering nozzle 220 enters through tangential inlets 226, 228, nozzle 220 is operating in droplet mode wherein the discharge pattern from nozzle 220 may have some characteristics of both mist and stream with the exact character of the discharge pattern depending on the ratio of the flow entering the nozzle via the various inlets 224, 226, 228.

Figure 6:
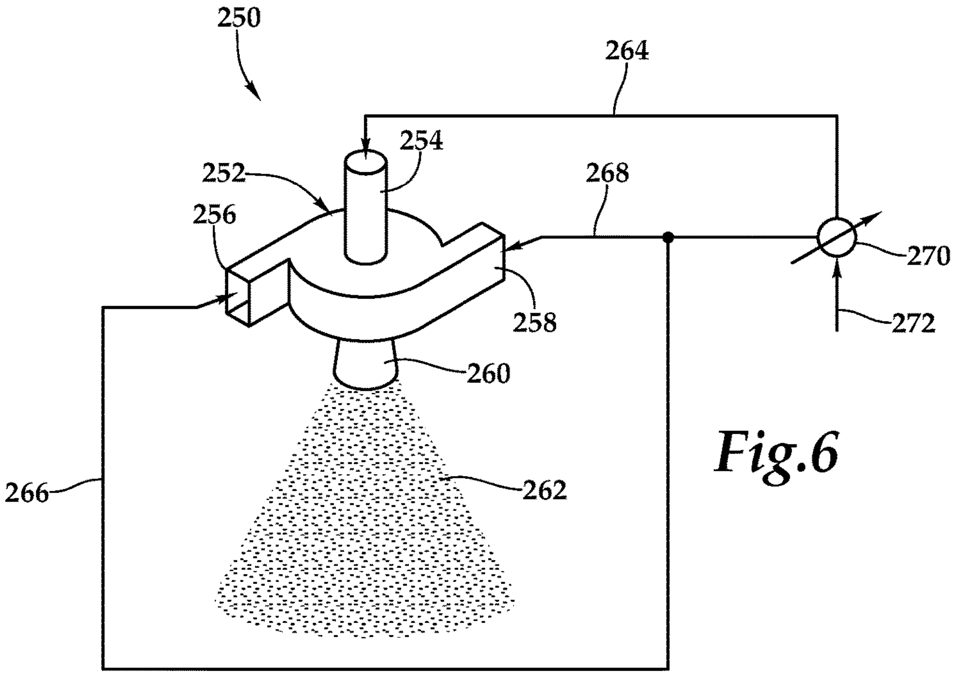
FIG. 6 is a piping diagram showing the multi-mode fluid nozzle of FIGS. 5A-5D connected to a fluid source in accordance with embodiments of the present disclosure.

FIG. 6 is a piping diagram showing inlet operations of a multi-mode fluid nozzle 252 that is connected to a fluid source 272 via piping network 250. As shown and described above, multi-mode fluid nozzle 252 has three inlets, central inlet 254, tangential inlet 256 and tangential inlet 258. Fluid flow exits nozzle 252 via nozzle outlet 260 in a discharge pattern 262. As described above, discharge pattern 262 may be in a stream flow discharge pattern, a mist flow discharge pattern or a droplet flow discharge pattern. In the illustrated embodiment, discharge pattern 262 is a droplet flow discharge pattern. Central inlet 254 is fed by central line 264. Tangential inlets 256, 258 are fed by tangential lines 266, 268, respectively. Proportioning valve 270 directs flow from fluid source 272 into lines 264, 266, 268. When stream flow is desired, proportioning valve 270 may be set to feed all of the flow from fluid source 272 into central line 264 and thereby to central inlet 264, the steam position of proportioning valve 270. When mist flow is desired, proportioning valve 270 may be set to feed all of the flow from fluid source 272 into tangential lines 266, 268 and thereby to tangential inlets 256, 258, the mist position of proportioning valve 270. When a droplet flow is desired, proportioning valve 270 may be set to an infinite number of positions between the steam position and mist position of proportioning valve 270.

Figures 7A, 7B, 7C:
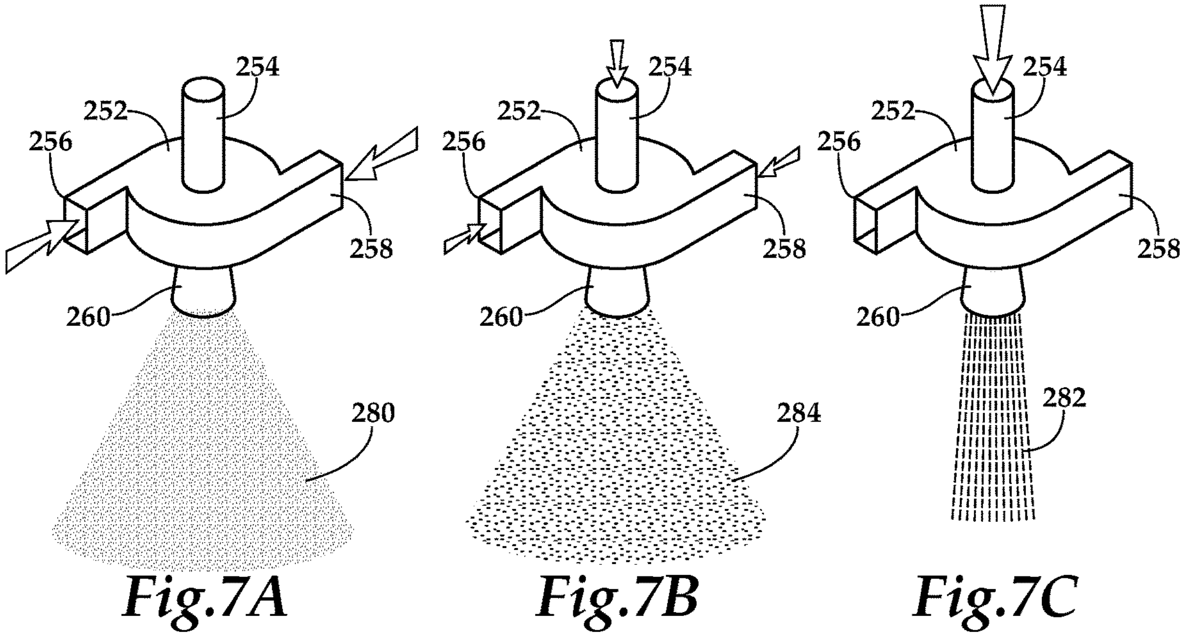
FIGS. 7A-7C are isometric views of the multi-mode fluid nozzle of FIGS. 5A-5D in various flow modes in accordance with embodiments of the present disclosure.

For example, as best seen in FIG. 7A, multi-mode fluid nozzle 252 is receiving all of the incoming flow via tangential inlets 256, 258, thus generating a significant level of mist flow depicted as discharge pattern 280. In this mode, nozzle 252 is not receiving any incoming flow to central inlet 254. Accordingly, there is no stream flow from outlet 260 in the mode shown in FIG. 7A. Mist flow discharge pattern 280 may have a characteristically small and uniform drop size that form a cone. As another example, as best seen in FIG. 7C, nozzle 252 is receiving all of the incoming flow via central inlet 254, thus generating a substantial level of stream flow depicted as discharge pattern 282. In this mode, nozzle 252 is not receiving any incoming flow to tangential inlets 256, 258. Accordingly, there is no mist flow from outlet 260 in the mode shown in FIG. 7C. Stream flow discharge pattern 280 may have a characteristically large and uniform drop size that form a tight cone.

In a further example, as best seen in FIG. 7B, nozzle 252 is receiving substantial incoming flow via central inlet 254 as well as tangential inlets 256, 258. In this mode, nozzle 252 generates a droplet flow discharge pattern 284. Depending upon the exact ratio of incoming flow to central inlet 254 compared to tangential inlets 256, 258, droplet flow discharge pattern 284 may have a generally-uniform drop size that is between that of the small drop size associated with mist flow discharge pattern 280 and the large drop size associated with stream flow discharge pattern 282 or may have a drop size distribution between the small drop size associated with mist flow discharge pattern 280 and the large drop size associated with stream flow discharge pattern 282.

Figure 8:
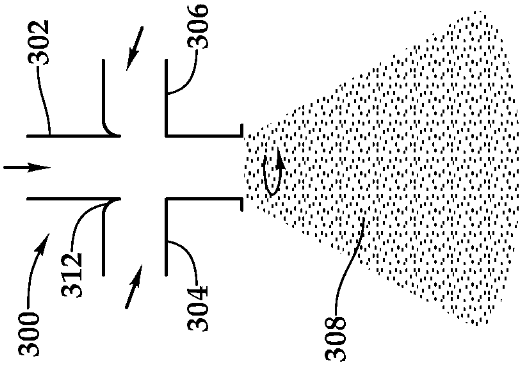
FIG. 8 is a side section view of a multi-mode fluid nozzle in accordance with embodiments of the present disclosure.

FIG. 8 is a side section view of an alternate fluid nozzle 300 according to the present disclosure. Nozzle 300 features central inlet 302, tangential inlet 304 and tangential inlet 306. As described above, fluid entering nozzle 300 through inlets 302, 304, 306 exits nozzle 300 in the form of a discharge pattern 308 that may have characteristics of stream flow, mist flow or droplet flow. Nozzle 300 is distinguished from the nozzles described above in the fact that nozzle 300 incorporates a circumferential ridge 312 at the interface between the upper surface of the mixing chamber of nozzle 300 and central inlet 302. Ridge 312 guides and shapes the swirling flow in the mixing chamber of nozzle 300.

Figure 9:
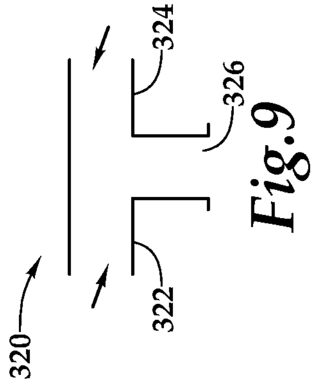
FIG. 9 is a side section view of a multi-mode fluid nozzle in accordance with embodiments of the present disclosure.

FIG. 9 is a side section view of an alternate fluid nozzle 320 according to the present disclosure. Nozzle 320 incorporates tangential inlet 322, tangential inlet 324 and outlet 326. Nozzle 320 is distinguished from the nozzles described above in the fact that nozzle 320 does not incorporate a central inlet. Thus, nozzle 320 is capable of generating mist flow, but is not capable of generating stream flow or droplet flow.

Figure 10:
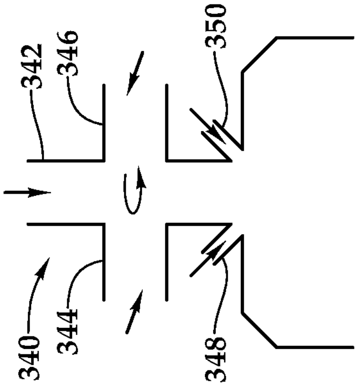
FIG. 10 is a side section view of a multi-mode fluid nozzle in accordance with embodiments of the present disclosure.

FIG. 10 is a side section view of an alternate fluid nozzle 340 according to the present disclosure. Similar to the nozzles describe above, nozzle 340 incorporates central inlet 342, tangential inlet 344 and tangential inlet 346, and is thus capable of generating a stream flow discharge pattern, a mist flow discharge pattern or a droplet flow discharge pattern. Nozzle 340 is distinguished from the nozzles described above by the fact that nozzle 340 incorporates a plurality of angled jets depicted as angled jets 348, 350 that enable air injection to provide air encapsulation flow modes for nozzle 340.

Figure 11:
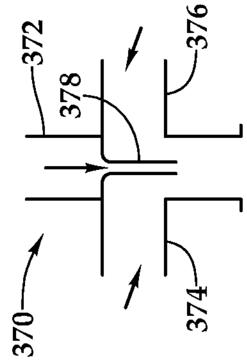
FIG. 11 is a side section view of a multi-mode fluid nozzle in accordance with embodiments of the present disclosure.

FIG. 11 is a side section view of an alternate fluid nozzle 370 according to the present disclosure. Nozzle 370 incorporates central inlet 372, tangential inlet 374 and tangential inlet 376, and is thus capable of generating a stream flow discharge pattern, a mist flow discharge pattern or a droplet flow discharge pattern. Nozzle 370 is distinguished from the nozzles described above by the fact that nozzle 370 incorporates central jet 378, which serves to enhance the velocity of fluid through the nozzle and to shape the swirling flow within the nozzle.

Figure 12:
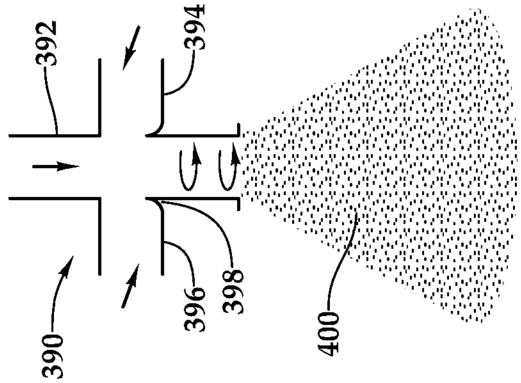
FIG. 12 is a side section view of a multi-mode fluid nozzle in accordance with embodiments of the present disclosure.

FIG. 12 is a side section view of an alternate fluid nozzle 390 according to the present disclosure. Nozzle 390 incorporates central inlet 392, first tangential inlet 394 and second tangential inlet 396, and is thus capable of generating a discharge pattern 400 that may have characteristics of stream flow, mist flow and/or droplet flow. Nozzle 390 is distinguished from the nozzles described above by the fact that nozzle 390 incorporates a circumferential ridge 398 at the interface between the lower surface of the mixing chamber and the outlet of nozzle 390 that guides and shapes the swirling flow within nozzle 390.

Figure 13:
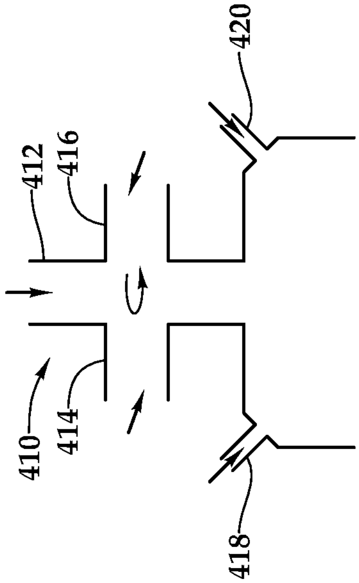
FIG. 13 is a side section view of a multi-mode fluid nozzle in accordance with embodiments of the present disclosure.

FIG. 13 is a side section view of an alternate fluid nozzle 410 according to the present disclosure. Nozzle 410 incorporates central inlet 412, tangential inlet 414 and tangential inlet 416, and is thus capable of generating a discharge pattern that may have characteristics of stream flow, mist flow and/or droplet flow. Nozzle 410 is distinguished from the nozzles described above by the fact that it incorporates a plurality of angled jets depicted as angled jets 418, 420, that enable air injection to provide air encapsulation flow modes for nozzle 410.

Figure 14:
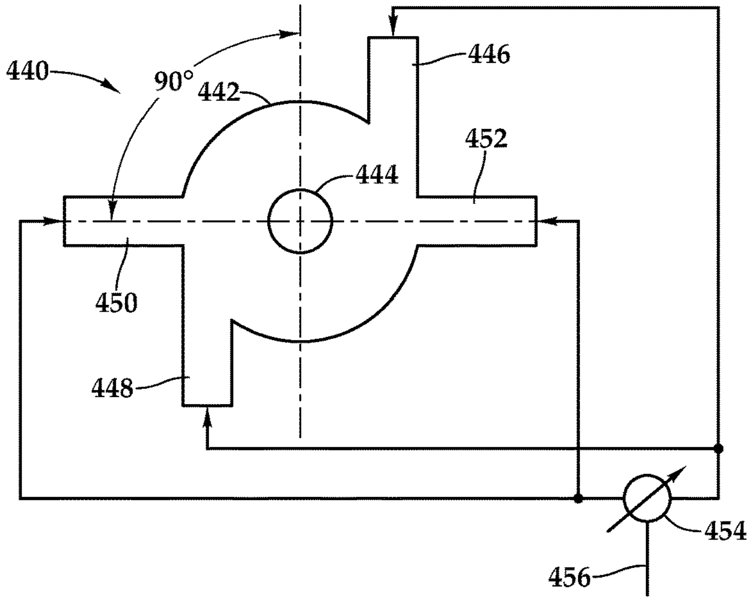
FIG. 14 is a top section view of a multi-mode fluid nozzle in accordance with embodiments of the present disclosure.

FIG. 14 is a top view of a fluid network 440 according to the present disclosure. Fluid network includes a nozzle 442 that discharges fluid via outlet 444 and is being supplied via a set of four inlets. The inlets include tangential inlet 446, tangential inlet 448, transverse inlet 450 and transverse inlet 452. As described herein, tangential inlets 446, 448 contribute to a mist flow discharge pattern. In the illustrated embodiment, transverse inlets 450, 452 contribute to stream flow discharge pattern. Fluid network 440 incorporates proportioning valve 454 to regulate fluid flow from fluid source 456 to inlets 446, 448, 450, 452. When a mist flow discharge pattern is desired, all or a higher proportion of fluid flow may be directed, via proportioning valve 454, to tangential inlets 446, 448. When a stream flow discharge pattern is desired, all or a higher proportion of fluid flow may be directed to transverse inlets 450, 452. When a droplet flow discharge pattern is desired, proportioning valve 454 may direct fluid flow to each of inlets 446, 448, 450, 452.

Figure 15A:
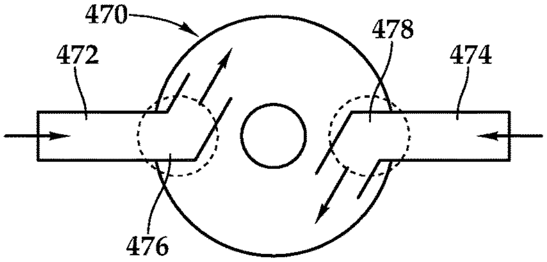
FIGS. 15A-15B are top section views of an articulated jet fluid nozzle in various flow modes in accordance with embodiments of the present disclosure.
Figure 15B:
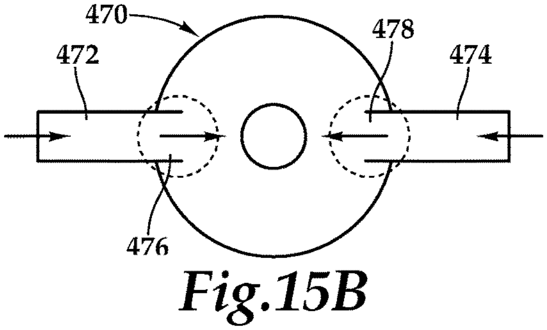

FIGS. 15A and 15B depict top section views of a fluid nozzle 470 in first and second flow modes, respectively, according to the present disclosure. Nozzle 470 receives incoming flow via side inlet 472 and side inlet 474. Side inlet 472 feeds articulated jet 476, while side inlet 474 feeds articulated jet 478. Articulated jets 476, 478 are operable to be articulated between a transverse orientation and a tangential orientation. In their tangential orientation, as shown in FIG. 15A, articulated jets 476, 478 contribute primarily to flow in a mist flow discharge pattern. In their transverse orientation, as shown in FIG. 15B, articulated jets 476,478 contribute primarily to flow in a stream flow discharge pattern.

Figure 16:
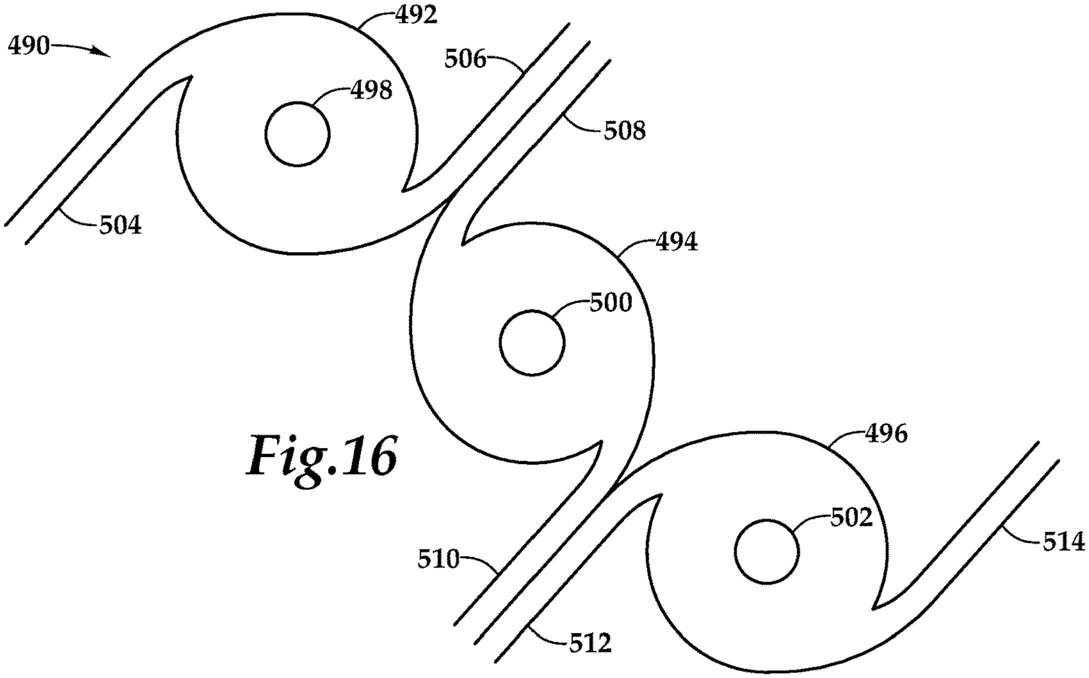
FIG. 16 is an array of multi-mode fluid nozzles in accordance with embodiments of the present disclosure.

FIG. 16 depicts an array 490 of multi-mode fluid nozzles 492, 494, 496. Nozzles 492, 496, 498 are fed via central inlets 498, 500, 502, which operate in a similar manner to the central inlets described above. Preferably, central inlets 498, 500, 502 are feed from a single manifold such that inflow into each of central inlets 498, 500, 502 is substantially equal. Each of nozzles 492, 494, 496 is also fed by a pair of tangential inlets. Nozzle 492 is fed by tangential inlets 504, 506, nozzle 494 is fed by tangential inlets 508, 510 and nozzle 496 is fed by tangential inlets 512, 514. Preferably, tangential inlets 504, 506, 508, 510, 512, 514 are feed from a single manifold such that inflow into each of central inlets tangential inlets 504, 506, 508, 510, 512, 514 is substantially equal. In this design, a single proportioning valve could be used to regulate fluid flow from a fluid source to the desired inlets to generate the desired mist flow discharge pattern, stream flow discharge pattern or droplet flow discharge pattern. Even though array 490 has been depicted and described as including a particular number of multi-mode fluid nozzles, it should be understood by those having ordinary skill in the art that an array of multi-mode fluid nozzles for use in a shower head, faucet or similar device, could have any number of multi-mode fluid nozzles both greater than and less that shown.

Figure 17A:
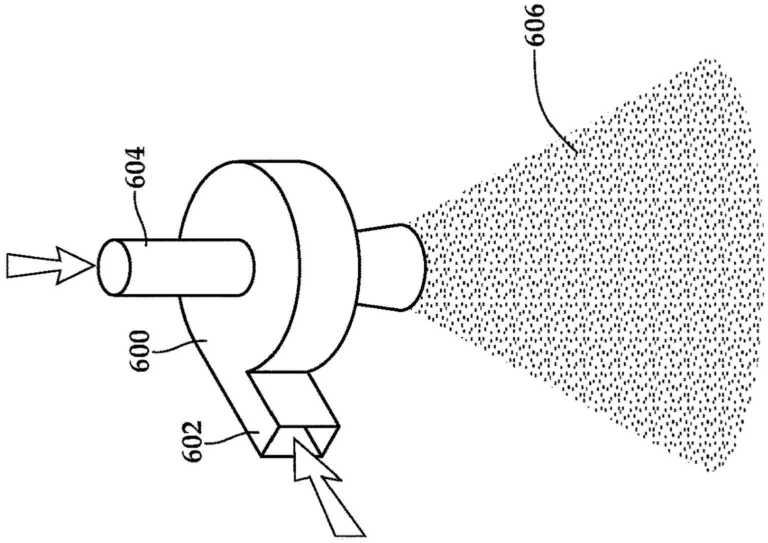
FIGS. 17A-17C are isometric views of the multi-mode fluid nozzle in accordance with embodiments of the present disclosure.
Figure 17B:
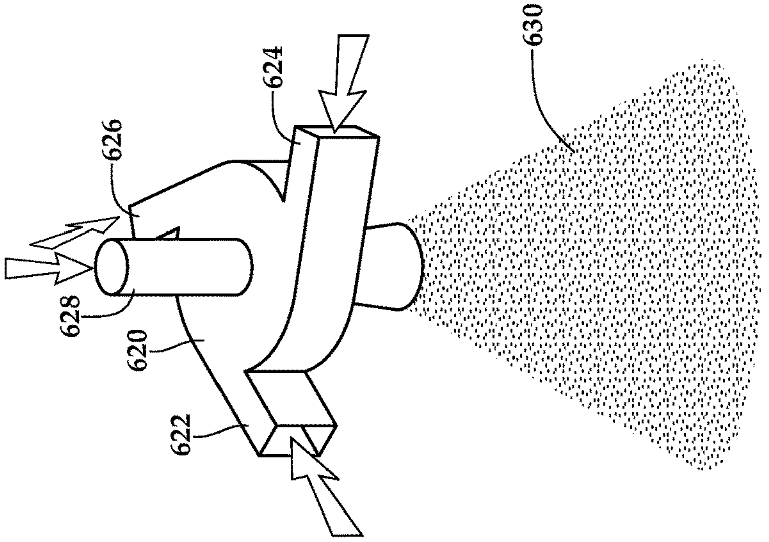
Figure 17C:
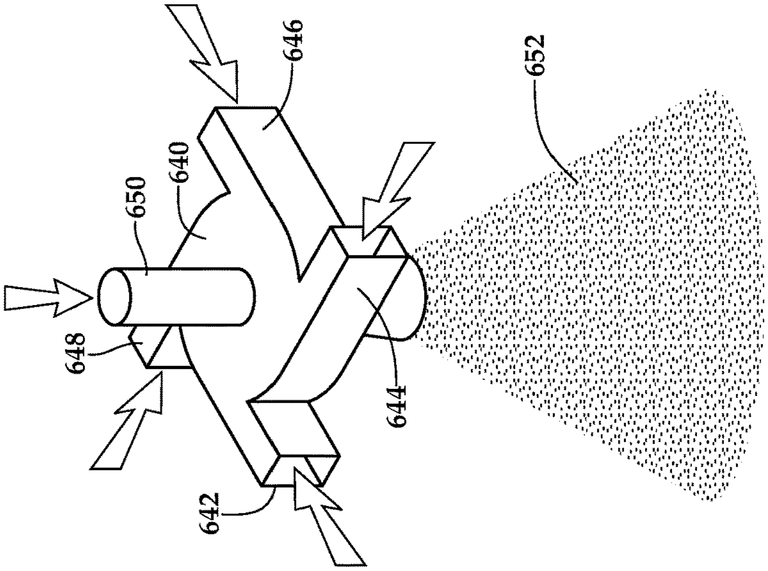

Even though the multi-mode fluid nozzles of the present disclosure have been depicted and described as including a particular number of tangential inlets, it should be understood by those having ordinary skill in the art that the multi-mode fluid nozzles of the present disclosure, could have any other numbers of tangential inlets both greater than and less two. For example, as best seen in FIG. 17A, multi-mode fluid nozzle 600 includes a single tangential inlet 602 and a central inlet 604 such that multi-mode fluid nozzle 600 is capable of generating a discharge pattern 606 that may have characteristics of stream flow, mist flow and/or droplet flow. As another example, as best seen in FIG. 17B, multi-mode fluid nozzle 620 includes a three tangential inlets 622, 624, 626 and a central inlet 628 such that multi-mode fluid nozzle 620 is capable of generating a discharge pattern 630 that may have characteristics of stream flow, mist flow and/or droplet flow. As a further example, as best seen in FIG. 17C, multi-mode fluid nozzle 640 includes a four tangential inlets 642, 644, 646, 648 and a central inlet 650 such that multi-mode fluid nozzle 640 is capable of generating a discharge pattern 652 that may have characteristics of stream flow, mist flow and/or droplet flow.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A multi-mode fluid nozzle comprising:

a mixing chamber having a generally-circular first side having a diameter, a generally-circular second side opposite of the first side and spaced from the first side by a length, a periphery disposed between the first and second sides and a central portion;

a stream mode fluid inlet connected to the first side of the mixing chamber at the central portion thereof;

at least one mist mode fluid inlet connected to the periphery of the mixing chamber; and a fluid outlet connected to the second side of the mixing chamber at the central portion thereof;

wherein, the diameter of the first side is greater than the length of the mixing chamber; and wherein, the multi-mode fluid nozzle has an adjustable discharge pattern configurable between a plurality of discharge patterns including a stream flow discharge pattern, a mist flow discharge pattern and a droplet flow discharge pattern, the adjustable discharge pattern being dependent upon the inlets from which fluid enters the mixing chamber such that when all of the fluid enters the mixing chamber through the stream mode fluid inlet, the fluid exits the fluid outlet in the stream flow discharge pattern, when all of the fluid enters the mixing chamber through the at least one mist mode fluid inlet, the fluid exits the fluid outlet in the mist flow discharge pattern and when some of the fluid enters the mixing chamber through the stream mode fluid inlet and some of the fluid enters the mixing chamber through the at least one mist mode fluid inlet, the fluid exits the fluid outlet in the droplet flow discharge pattern.

2. The multi-mode fluid nozzle as recited in claim 1 wherein, the at least one mist mode fluid inlet is connected at an angle tangential to the periphery of the mixing chamber.

3. The multi-mode fluid nozzle as recited in claim 1 wherein, the at least one mist mode fluid inlet further comprises at least first and second mist mode fluid inlets each of which is connected at an angle tangential to the periphery of the mixing chamber.

4. The multi-mode fluid nozzle as recited in claim 1 wherein, the at least one mist mode fluid inlet is three mist mode fluid inlets, each of which is connected at an angle tangential to the periphery of the mixing chamber.

5. The multi-mode fluid nozzle as recited in claim 1 wherein, the at least one mist mode fluid inlet is four mist mode fluid inlets, each of which is connected at an angle tangential to the periphery of the mixing chamber.

6. The multi-mode fluid nozzle as recited in claim 1 wherein, the diameter of the first side is greater than twice the length of the mixing chamber.

7. The multi-mode fluid nozzle as recited in claim 1 wherein, the stream mode fluid inlet is coaxial with the fluid outlet.

8. The multi-mode fluid nozzle as recited in claim 1 wherein, the fluid outlet is a diverging conical fluid outlet.

9. The multi-mode fluid nozzle as recited in claim 1 further comprising a circumferential ridge disposed within the mixing chamber, the circumferential ridge configured to guide and shape swirling flow in the mixing chamber.

10. The multi-mode fluid nozzle as recited in claim 9 wherein, the circumferential ridge forms an outer sloped surface.

11. The multi-mode fluid nozzle as recited in claim 9 wherein, the circumferential ridge is disposed within the mixing chamber at an interface between the fluid outlet and the second side of the mixing chamber.

12. The multi-mode fluid nozzle as recited in claim 11 wherein, the circumferential ridge tapers from increasing to decreasing thickness from the second side toward the first side of the mixing chamber.

13. The multi-mode fluid nozzle as recited in claim 9 wherein, the circumferential ridge is disposed within the mixing chamber at an interface between the stream mode fluid inlet and the first side of the mixing chamber.

14. The multi-mode fluid nozzle as recited in claim 13 wherein, the circumferential ridge tapers from increasing to decreasing thickness from the first side toward the second side of the mixing chamber.

15. A multi-mode fluid flow head comprising:

a plurality of multi-mode fluid nozzles each having an adjustable discharge pattern configurable between a plurality of discharge patterns including a stream flow discharge pattern, a mist flow discharge pattern and a droplet flow discharge pattern, each nozzle comprising:

a mixing chamber having a generally-circular first side having a diameter, a generally-circular second side opposite of the first side and spaced from the first side by a length, a periphery disposed between the first and second sides and a central portion;

a stream mode fluid inlet connected to the first side of the mixing chamber at the central portion thereof;

at least one mist mode fluid inlet connected to the periphery of the mixing chamber; and a fluid outlet connected to the second side of the mixing chamber at the central portion thereof;

wherein, the diameter of the first side is greater than the length of the mixing chamber; and wherein, the adjustable discharge pattern of the multi-mode fluid nozzle is dependent upon the inlets from which fluid enters the mixing chamber such that when all of the fluid enters the mixing chamber through the stream mode fluid inlet, the fluid exits the fluid outlet in the stream flow discharge pattern, when all of the fluid enters the mixing chamber through the at least one mist mode fluid inlet, the fluid exits the fluid outlet in the mist flow discharge pattern and when some of the fluid enters the mixing chamber through the stream mode fluid inlet and some of the fluid enters the mixing chamber through the at least one mist mode fluid inlet, the fluid exits the fluid outlet in the droplet flow discharge pattern.

16. The multi-mode fluid flow head as recited in claim 15 wherein, the multi-mode fluid flow head is a multi-mode shower head assembly.

17. The multi-mode fluid flow head as recited in claim 15 wherein, the plurality of multi-mode fluid nozzles forms at least one circular array of multi-mode fluid nozzles.

18. The multi-mode fluid flow head as recited in claim 15 wherein, the plurality of multi-mode fluid nozzles forms a plurality of circular arrays of multi-mode fluid nozzles.

19. The multi-mode fluid nozzle as recited in claim 1 wherein, the fluid is a liquid selectably flowable through the inlets.

20. The multi-mode fluid flow head as recited in claim 15 further comprising a proportioning valve to adjust between the plurality of discharge patterns.

* * * * *